United States Patent
Hnizdor

[19]

[11] Patent Number: 5,953,850
[45] Date of Patent: Sep. 21, 1999

[54] ARTIFICIAL FLY/LURE

[76] Inventor: Thomas A. Hnizdor, 9164 Brady, Redford, Mich. 48239

[21] Appl. No.: 09/035,579

[22] Filed: Mar. 5, 1998

Related U.S. Application Data

[63] Continuation-in-part of application No. 08/697,691, Sep. 5, 1996, abandoned, which is a continuation of application No. 08/420,479, Apr. 12, 1995, Pat. No. 5,628,140.

[51] Int. Cl.$^6$ .................................................. A01K 85/08
[52] U.S. Cl. ........................................ 43/42.26; 43/42.25
[58] Field of Search .............................. 43/42.32, 42.33, 43/42.25, 42.26, 42.27

[56] References Cited

U.S. PATENT DOCUMENTS

| | | | |
|---|---|---|---|
| Re. 14,377 | 10/1917 | Cox | 43/42.27 |
| D. 87,373 | 7/1932 | Weber | D22/128 |
| D. 87,374 | 7/1932 | Weber | D22/128 |
| D. 98,644 | 2/1936 | Burge | D22/128 |
| D. 101,906 | 11/1936 | Weaver | D22/128 |
| D. 122,028 | 8/1940 | Phelps | D22/128 |
| D. 133,949 | 9/1942 | Jacobs | D22/128 |
| 633,797 | 9/1899 | Cantrell | 43/42.25 |
| 862,150 | 8/1907 | Fredricks | 43/41 |
| 975,833 | 11/1910 | Cox | 43/42.25 |
| 1,505,235 | 8/1924 | Archer | 43/44.8 |
| 1,522,185 | 1/1925 | Hawes | 43/42.27 |
| 1,540,586 | 6/1925 | Adam | 43/42.26 |
| 1,635,644 | 7/1927 | Sloan | 43/42.25 |
| 1,994,692 | 3/1935 | Davenport | 43/42.27 |
| 2,187,666 | 1/1940 | Schumann | 43/42.27 |
| 2,231,949 | 2/1941 | Rinehart | 43/42.27 |
| 2,242,708 | 5/1941 | Lancaster | 43/42.27 |
| 2,333,484 | 11/1943 | Miles | 43/42.33 |
| 2,423,431 | 7/1947 | Allen | 43/42.25 |
| 2,473,142 | 6/1949 | Gilmore | 43/42.26 |
| 2,583,942 | 1/1952 | Harvey | 43/42.26 |
| 2,611,985 | 9/1952 | Lloyd, Jr. | 43/42.25 |
| 2,632,278 | 3/1953 | Raymond | 43/42.25 |
| 2,686,381 | 8/1954 | Peterson | 43/44.8 |
| 3,032,911 | 6/1962 | Wilhelmi | 43/42.37 |
| 3,133,371 | 5/1964 | Christensen | 43/42.25 |
| 3,477,164 | 11/1969 | Novak | 43/44.8 |
| 3,568,354 | 3/1971 | Yacko | 43/41 |
| 3,774,335 | 11/1973 | Sisty | 43/42.25 |
| 4,163,337 | 8/1979 | Kress | 43/42.05 |
| 4,186,510 | 2/1980 | Kimerer, Jr. | 43/42.25 |
| 4,437,257 | 3/1984 | Kluge | 43/42.45 |
| 4,823,502 | 4/1989 | Tucker | 43/42.33 |
| 4,854,071 | 8/1989 | Kendall | 43/42.5 |
| 4,862,630 | 9/1989 | Welch | 43/42.26 |
| 4,965,957 | 10/1990 | Hnizdor | 43/44.82 |
| 5,394,637 | 3/1995 | Hnizdor | 43/43.16 |
| 5,446,991 | 9/1995 | Brackus | 43/42.25 |
| 5,524,380 | 6/1996 | Hnizdor | 43/42.47 |

OTHER PUBLICATIONS

The Orvis Fishing and Outdoor Catalog 1997, Orvis Fly–Tying & Rod Building 1997, p. 16B, Jan. 1997.
1998 Feather–Craft Fly Fishing Bulletin/Catalog, p. 40, 905 Anderson's McCrab, Jan. 1998.

*Primary Examiner*—Michael J. Carone
*Assistant Examiner*—Darren W. Ark
*Attorney, Agent, or Firm*—Young & Basile, PC

[57] ABSTRACT

An artificial fly/lure includes a body mounted about the shank of a fish hook between the eye and bend of the fish hook. In one embodiment, a tear resistant, open mesh weave body is mounted over the insert. The open mesh weave body may also be secured at opposite ends to the shank of a fish hook without any rigid insert disposed therein. In another embodiment, the insert is formed of a plurality of turns of shaped, hardened fiberglass tape wound in a plurality of turns about the shank of a fish hook. A weave open mesh body may be applied about the hardened fiberglass body. In another embodiment, the insert is formed of a closed-cell or open-cell foam material formed in an attractor fish shape. In another embodiment, the body has tubular members joined thereto and extending outward on opposite sides of the body in the form of appendages to simulate a crustacean. In this embodiment, the shank of the hook extends longitudinally through the body. Alternately, the body is formed of first and second bodies, each joined to the shank of a fish hook at spaced locations to simulate a lobster.

9 Claims, 9 Drawing Sheets

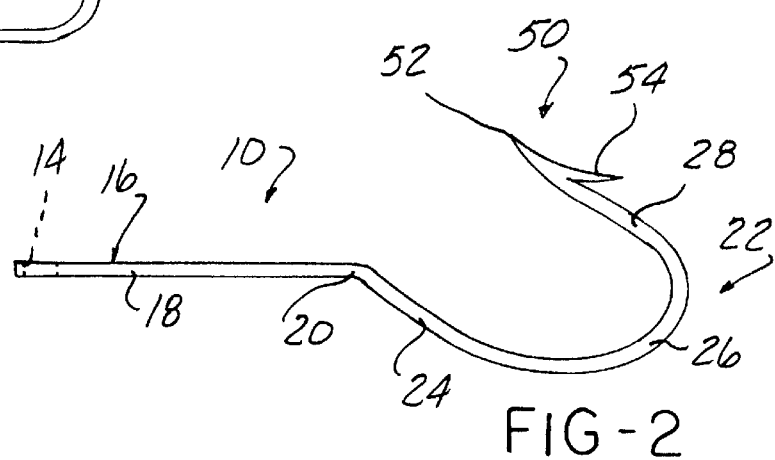
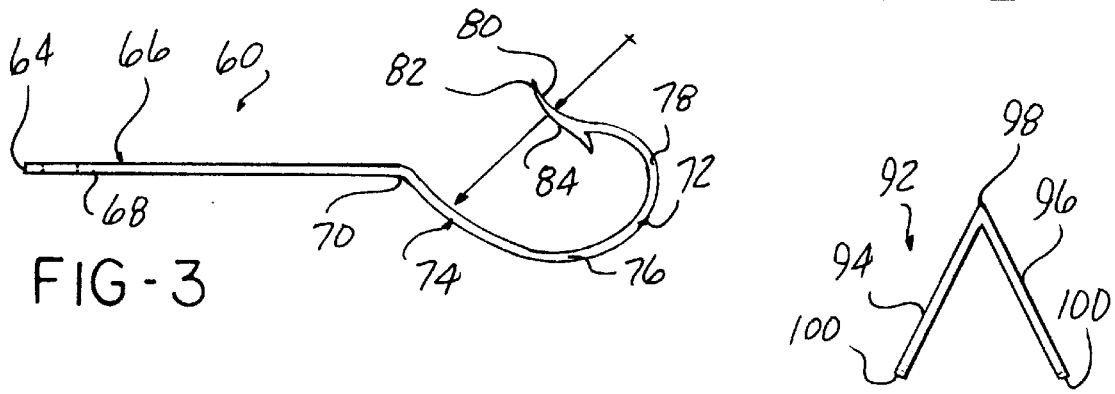
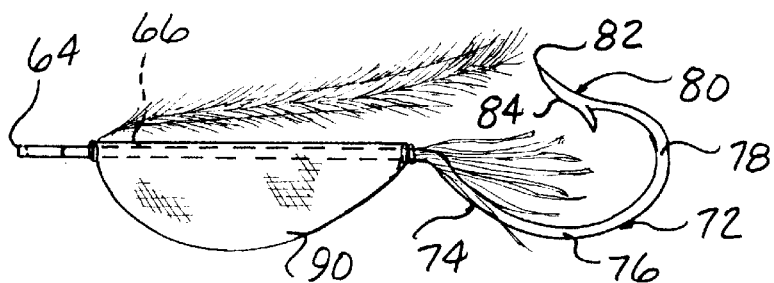
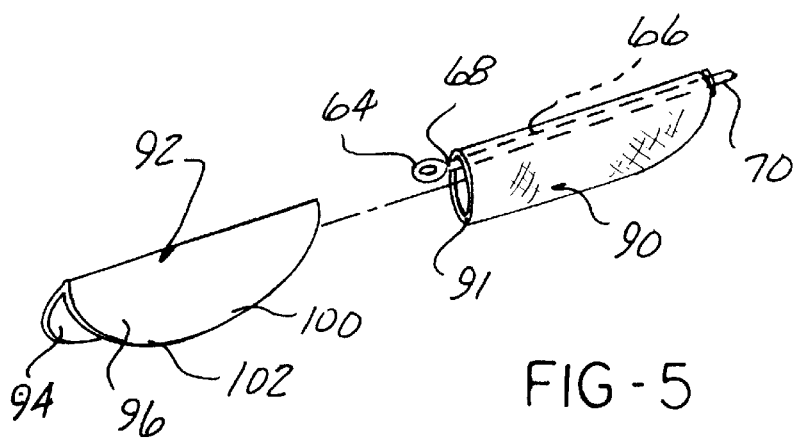

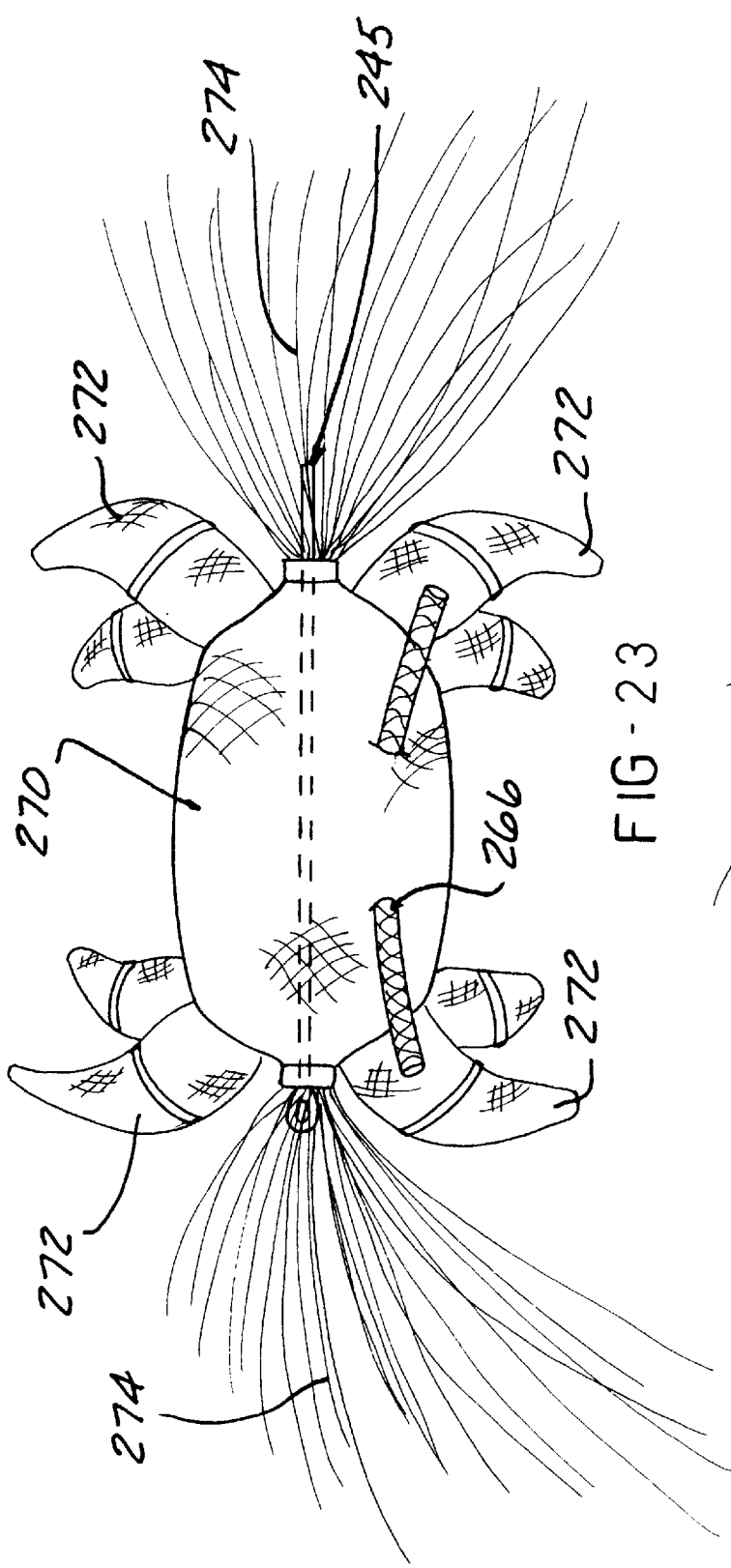
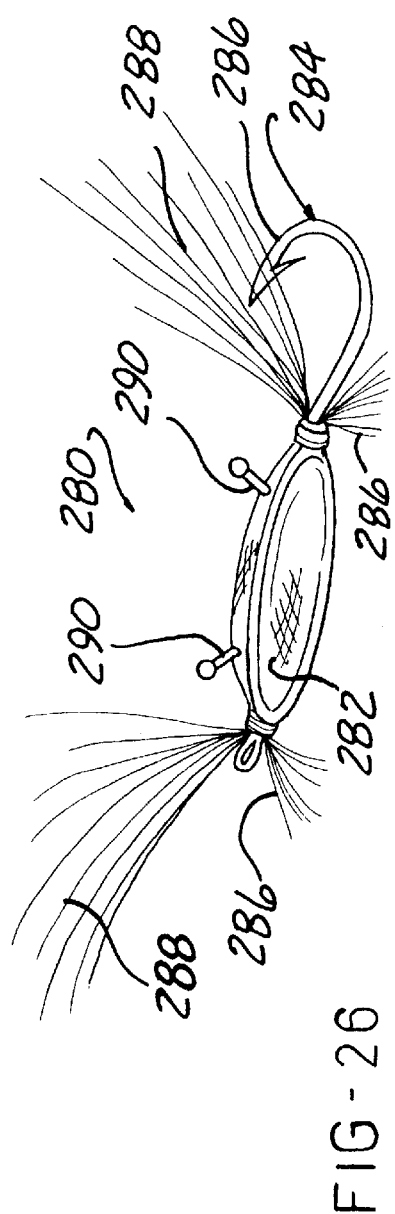
FIG-23
FIG-26

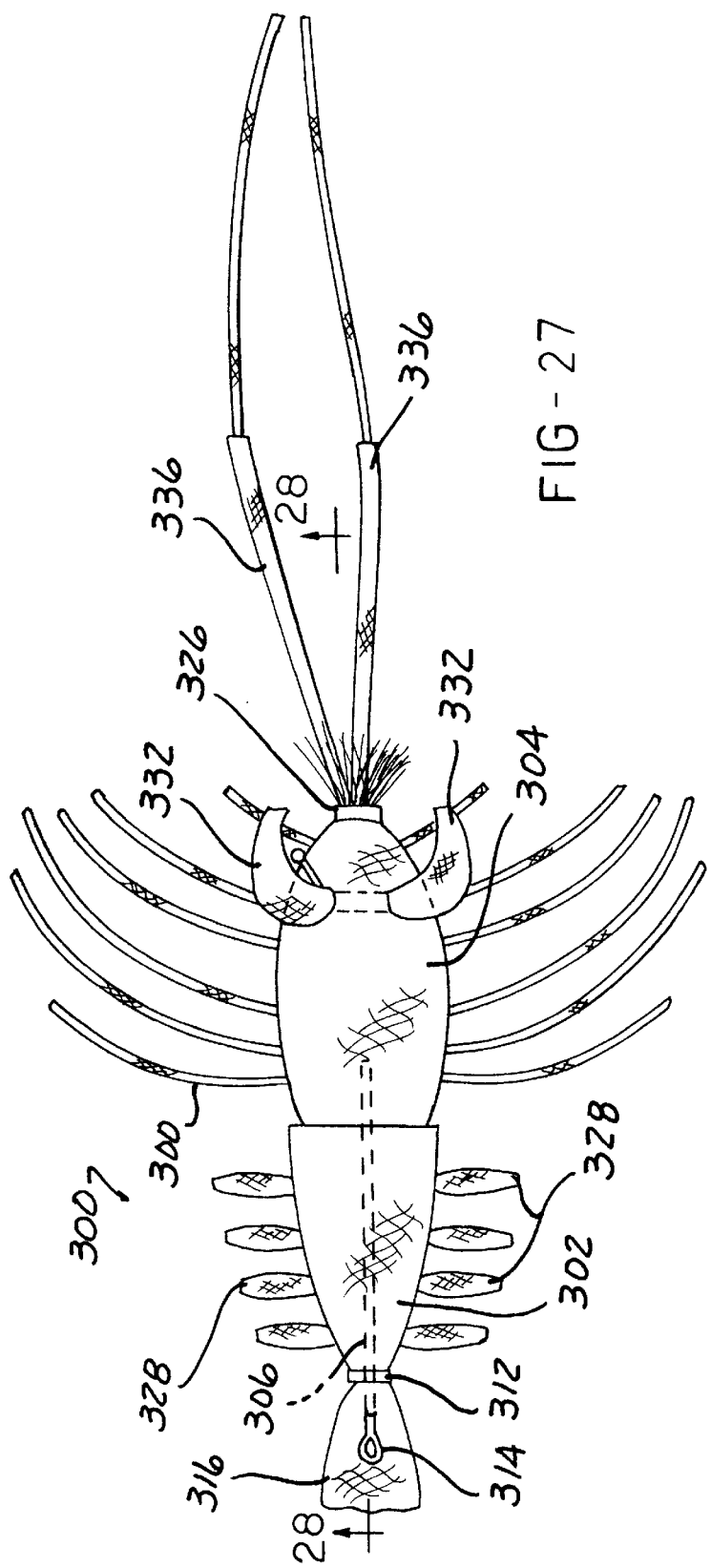
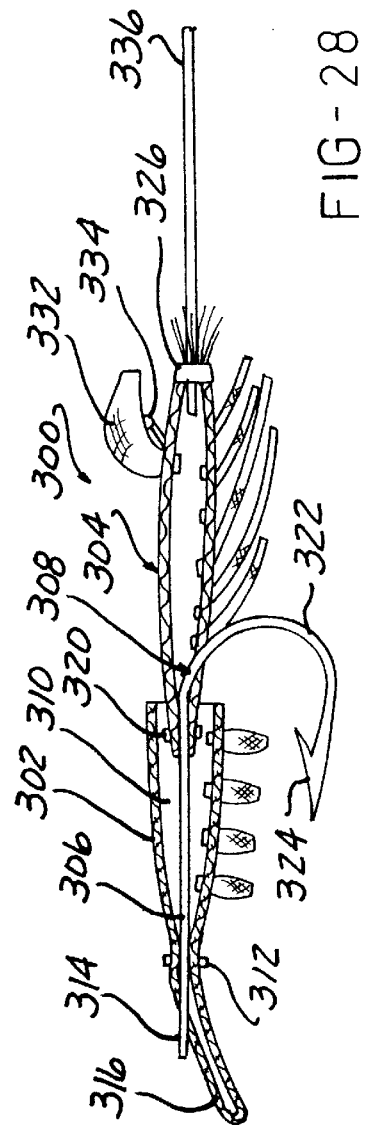

ARTIFICIAL FLY/LURE

CROSS REFERENCE TO CO-PENDING APPLICATION

This application is a continuation-in-part of application Ser. No. 08/697,691, filed Sep. 5, 1996 now abandoned in the name of Thomas A. Hnizdor and entitled "ARTIFICIAL FLY/LURE" which is a continuation of Ser. No. 08/420,479 filed Apr. 12, 1995, now U.S. Pat. No. 5,628,140, issued May 13, 1997 in the name of Thomas A. Hnizdor and entitled "KEELING BEND FLY HOOK".

BACKGROUND OF THE INVENTION

1. Field of the Invention

The present invention relates, in general, to artificial flies and lures.

2. Description of the Art

Hundreds of fish hooks of many different sizes and shapes have been devised for specific purposes. Hook shape can vary in a number of different features or parts including, gap size, point type, bend shape and bend offset, to name a few, depending upon the type of fish being sought, fishing conditions, or the type of fishing, i.e., bait or fly fishing.

Fly hooks have a tendency to ride hook point down in the water with the hook point located below the shank due to the weight of the bend and point portion of the hook. A large number of fishing flies have a floatation member mounted on the shank of the hook. This floatation member also causes the hook to ride in a downward facing position below the shank when the hook is cast into the water or drawn toward the fisherman. Such a hook down position makes hooking fish that have downward facing mouths quite difficult. Thus, many anglers, and in particular, salt water anglers, would prefer the flies to ride in a hook up position.

Keel hooks, as shown in FIG. 1, have a step shank with a straight point which is parallel to the shank. Such keel hooks are usually snagless since the point rides upward due to the weight of the keel or bend portion of the shank. However, such keel hooks have a relatively short shank due to the step which places a major portion of the length of the shank in the keel portion of the hook. Present day keel hooks teach the use of heavy, or weighted materials on the step shank portion of the hook to cause the hook to invert and ride in a point up position, as taught by McClane's, page 509, supra. However, any floatation or buoyant material mounted on the step shank of a present day keel hook would cause the bend and shank portion of the hook to be heavier than the floating portion of the fly thereby revolving the body until the heaviest portions are in the lowermost position. This places the hook in the undesired downward position.

In order to provide the more desirable hook point up feature, fly tiers and fly anglers have been known to tie lead eyes below the shank of the hook with the hook in a point up position. Gravity causes the lead eyes to invert the hook to a desired point up position when fishing. Other fly materials consisting of a body and wings are tied on the top of the hook shank with the bulk of such materials helping to turn the fly over to the hook point up position. While tying a fly in this manner is an effective means of making the fly ride in a hook point up orientation, the additional materials create an undesirable affect due to the weight which becomes more evident when fly casting. The less a fly weighs, the better it is for casting. Adding lead eyes to the fly makes the fly dangerous and uncomfortable to cast and, further, causes the fly to be cumbersome at the generation of the backcast.

Many salt water flies are tied in tandem with two spaced hooks interconnected by a steel cable extending from the end of the shank of one hook to the beginning of the shank of the second or rearmost hook. The frontmost hook is generally one size larger than the rear hook and, being much heavier and larger than the rear hook, acts as a keel to turn the fly over in the water when the rear hook is joined in the point up position to the front hook.

Artificial flies and lures have been formed in a shape to attract different species of fish. In the case of artificial flies, a fly simulating a natural fly, insect or small bait fish is mounted on a hook. Such flies typically comprise a buoyant body, feathers, etc. Other fly bodies have also been formed merely in an insect or bait fish attractor shape. Various colors and/or design patterns have also been placed on such flies to attract fish under certain light conditions, water visibility, etc.

In the case of many flies, the skills and artistic effort involved in constructing and assembling the various components to form a complete fly commonly results in what approaches a work of art. Besides having an aesthetic appeal, such flies are also effective in attracting fish. However, certain species of fish have large numbers of sharp teeth which destroy a fly when struck by such fish. Since the cost of flies can range from $1 to $10 or more, it can become quite expensive for a fisherman who is successful in landing a large number of fish by using relatively expensive flies.

FIG. 16 depicts a prior art method of constructing a tandem hook. In this prior art method, a cable has one end fixed in a crimp connector or clip which is disposed loosely adjacent the shank of the forwardmost hook. The cable extends from the first end through the eye of the first hook, along the shank of the first hook, through the eye of the rearmost hook and back into a second crimp connector disposed adjacent the eye of the rearmost hook. A plurality of threads are wound about the two portions of the cable extending along the shank of the forwardmost hook to securely attach the cable to the forwardmost hook. However, the threads are easily broken which causes the cable to separate from the forwardmost hook and break the generally axial in-line arrangement between the axially disposed shanks of the two hooks.

Thus, it would be desirable to provide an artificial fly or lure which is inexpensive in cost while having excellent fish attractor characteristics. It would also be desirable to provide an artificial fly/lure which can be covered with various designs, colors, etc., to extend its range of application under different fishing conditions and for use in attracting different species of fish. It would also be desirable to provide an artificial fly/lure which is effective as a fish attractor and at the same time has a tough outer layer which resists damage when stuck by the sharp teeth of a fish. It would also be desirable to provide a method of constructing a tandem fish hook which maintains the shanks of the two hooks axially in line for maximum axial pulling force while minimizing any separation of the cable from the first hook. It would also be desirable to provide an artificial fly or lure which can be constructed of different shapes simulating various crustaceans, such as crabs or lobsters wherein the bodies and the appendages of such flies are formed of the tough mesh material.

SUMMARY OF THE INVENTION

In one embodiment of the present invention, the artificial fly/lure of the present invention includes a body mounted on a fish hook between the eye and bend of the hook. The body is formed of a tubular, continuous open mesh having opposed first and second ends. The first end of the body is closingly attached to the shank adjacent the eye of the shank. The second end of the body is closed and, in one embodiment, attached to the shank adjacent the bend of the hook. The body forms a side wall spaced from the shank, with the side wall forming a hollow interior within the body. The mesh has apertures opening to the hollow interior within the body.

A tail extends from the second end of the body. Preferably, the tail is formed by fraying the second end of the body extending beyond the point of contact of the second end of the body with the shank of the fish hook. The tail has a natural major plane which is angularly offset from a plane formed by the shank and bend of the fish hook to impart a partial rotation to the artificial fly/lure when in the water.

Alternately, an insert may be mounted adjacent the shank within the hollow interior of the body. The insert is, in one embodiment, formed of a rigid plastic and preferably a transparent plastic. The rigid insert is formed of one or two identical discs fixedly mounted on the shank of the fish hook.

In another embodiment, the insert is a solid, three-dimensional insert disposed about the shank within the body. The three-dimensional insert is preferably formed of a plurality of turns of wound material, such as wet, softened fiberglass which is shaped and then allowed to dry to a hardened form.

In another embodiment, the insert is a resilient insert formed of a foam material. The foam material may be open-cell or closed-cell foam. A weave, open mesh body may be disposed about the foam insert.

The present invention provides an artificial fly/lure having a tough, pierce-resistant outer body which resists damage to the fly/lure caused by the sharp teeth of fish. At the same time, the outer body allows attractor colors and designs carried on inserts disposed within the body to be visible through the outer body to attract fish.

Different inserts may be mounted within the outer body and include rigid plastic discs which are transparent, or which are of various colors and/or carry designs, patterns, etc. The insert may also be formed of a shaped, hardened fiberglass tape wound in a plurality of turns about the shank. The insert may also be a resilient open or closed-cell foam material.

In another embodiment, the artificial fly comprises a hook having a shank, an eye at one end of the shank, and a bend and tip at another end of the shank, and a hollow body. The shank is disposed in the body with the bend and tip extending outward from one end of the body and the eye of the shank extending outward from an opposite end of the body. The body is formed of a continuous open mesh. A plurality of tubular appendages or legs are joined to the body to form the likeness of a crustacean. In yet another embodiment, a first body is secured to the shank of the fish hook, with one end of the first body folded inward on itself to form a hollow interior surrounding a portion of the shank of the fish hook. A second body is fixedly mounted at one end to the shank of the fish hook, the second body being substantially axially in line with the first body.

The present invention also comprises a fish hook formed of a first hook having an eye, a shank, a bend and a tip; a second hook having an eye, a shank, a bend and a tip: and an elongated, flexible means connected between the first and second hooks for disposing the shanks of the first and second hooks substantially axially in line and spaced apart. The flexible means has a first end portion interwovenly wound in a figure eight about the shank of the first hook between the eye and the end of the shank of the first hook. Means are provided for coupling the second end of the flexible means to the eye of the second hook.

The present invention provides advantages over previously devised tandem hooks by utilizing a unique cable winding method which insures that the cable remains attached to the shank of the first hook to maintain the shanks of the two tandem hooks axially in-line for maximum axial pulling force. The present invention also presents several different artificial flies or lures, all of which are formed of tubular mesh material which has been formed into various shapes simulating crustaceans, such as crabs or lobsters, with the mesh material forming both the body and the appendages of such flies. The use of the mesh material enables such artificial flies or lures to exhibit different actions in the water, such as floating on the surface, slowly drifting downward to the bottom of a lake or stream, or moving along the bottom.

BRIEF DESCRIPTION OF THE DRAWING

The various features, advantages and other uses of the present invention will become more apparent by referring to the following detailed description and drawing in which:

FIG. 1 is a front elevational view of a prior art keel hook;

FIG. 2 is a front elevational view of one embodiment of the keeling bend fly hook of the present invention;

FIG. 3 is a front elevational view of another embodiment of the keeling bend fly hook of the present invention;

FIG. 4 is a front elevational view of a body constructed in accordance with the teachings of the present invention mounted on the fly hook shown in FIG. 3;

FIG. 5 is an exploded, perspective view of the body shown in FIG. 4;

FIG. 6 is an end elevational view of the insert shown in FIG. 5;

FIG. 23 is a plan view of another embodiment of an artificial crab according to the present invention;

FIG. 26 is a bottom perspective view of yet another embodiment of an artificial crab according to the present invention;

FIG. 27 is a plan view of an artificial spiny lobster constructed in accordance with the teachings of the present invention;

FIG. 28 is a cross-sectional view generally taken along line 28—28 in FIG. 27.

DESCRIPTION OF THE PREFERRED EMBODIMENTS

Figure 10:
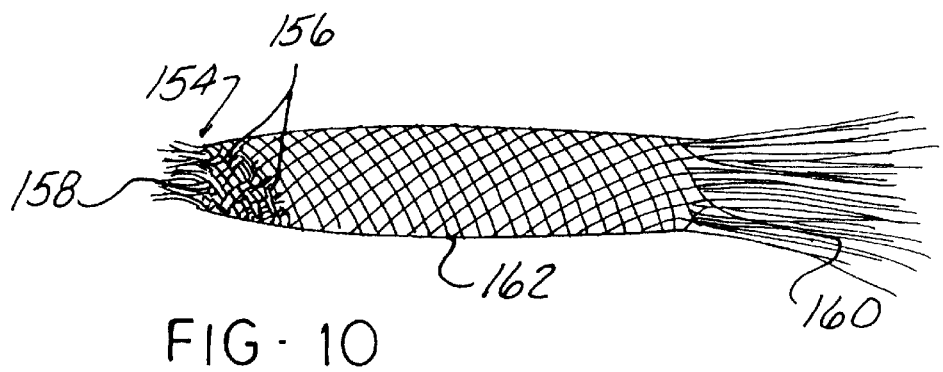
FIG. 10 is a side elevational view of a portion of another embodiment of an artificial fly/lure of the present invention.

Referring now to the drawing, and to FIGS. 2–6, there is depicted a artificial fly/lure constructed in accordance with the teachings of one embodiment of the present invention. A hook 10 usable with the artificial fly/lure of the present invention may be formed of any suitable hook material, such as stainless steel, etc. Further, the hook 10, while being shown in a relatively large size in FIGS. 2–4, may also be provided in other sizes, either smaller or larger than that depicted in FIGS. 2–4.

The hook 10 includes an eye 14. The eye 14 may have any typical eye shape, such as ball, tapered, looped, needle, brazed or flattened. In addition, the eye 14 may be provided in a number of different positions with respect to a shank 16, such as a ringed eye, a turned down eye or a turned up eye.

The shank 16 of the hook 10 has a first end 18 joined to and extending from the eye 14. The shank 16 and the eye 14 may be integrally formed as a continuous, unitary part of the hook 10. The shank 16 is linear or straight between the first end 18 and an opposed second end 20. The length of the shank 16 between the first and second ends 18 and 20, respectively, may be provided in any suitable length. However, it is preferred that the length of the shank 16 have a sufficient length so as to easily receive an attractor body or mass of buoyant material thereon, as described hereafter.

The hook 10 includes a bend 22 which extends continuously and preferably arcuately from the second end 20 of the shank 16. The bend 22 includes a first end bend portion 24 extending from the second end 20 of the shank 16, an intermediate bend portion 26, and a second end bend portion 28 which terminates in a point shown generally by reference number 50. The first end bend portion 24 is bent at a predetermined angle from the axis of the shank 16. In a preferred example, the first end portion 24 of the bend 22, and, in particular, a chord line extending through the opposite ends of the first end portion 24 is disposed at an angle of approximately 33° from the axis of the shank 16. The first end portion 24 curves smoothly into the intermediate bend portion 26. Due to the angular disposition of the first end portion 24 of the bend 22 from the axis of the shank 16, the first end portion 24 and the intermediate portion 26 of the bend 22 are disposed offset to one side of the axis of the shank 16. This provide a keel shape, similar to the prior art keel hook shown in FIG. 1, which provides weight to one side of the shank 16 so as to dispose the point 50 of the hook 10 in an upward position during use of the hook 10, as described hereafter.

The second end portion 28 of the bend 22 extends continuously from the intermediate portion 26 of the bend 22. The point 50 is formed at the end of the second end portion 28. In the embodiment shown in FIG. 2, the point 50 is formed as a rolled-out or bent-out point in which the tip 52 of the point 50 is bent out away from the shank 16.

Further, according to the present invention, the so-called "spear" portion of the hook which includes the point 50, a barb 54, and the second end portion 28 of the bend 22 is further bent-out from the shank 16. Preferably, the spear portion of the hook 10 is bent outward from the shank 16 until the spear portion including the second end portion 28 and the point 50 approaches a substantially parallel position with respect to the first end portion 24 of the bend 22. In this position, chord lines extending through each of the first and second end portions 24 and 28 are substantially parallel. This provides a sufficiently open gap for excellent raking penetration of the point 50 and hook retention.

The hook 10 may be fully dressed as a fly by mounting buoyant material, not shown, about the shank 16. The buoyant material may preferably be provided in an aerodynamic-shaped body formed of a suitable buoyant material, such as cork, STYROFOAM, etc. Feathers may be tied to the second end 20 of the shank 16 and extend outward therefrom around the hook 10. Preferably, the entire bend 22 in the hook 10 extends outward from the buoyant material or body.

Further details concerning the construction and mounting of the buoyant body on the shank 16 can be had by referring to U.S. Pat. No. 5,394,637, the contents of which are incorporated herein by reference.

The barb 54, which is formed on the second end bend portion 28 adjacent to the tip 52, extends exteriorly outward from the bend 22 away from the shank 16. This exterior or outward facing barb 54 provides increased holding power when a fish is hooked by the fly 10.

Referring now to FIG. 3, there is depicted another embodiment of the keeling bend fly hook 60 which may also be used with the artificial fly/lure of the present invention. In this embodiment, the hook 60 is formed with an eye 64 and a shank 66 having a first end 68 and an opposed second end 70, as described above and shown in FIG. 2.

In this embodiment, the fly hook 60 includes a keeling bend 72 formed of a first end portion 74 integrally joined to and extending from the second end 70 of the shank 66, an intermediate bend portion extending from one end of the first end portion 74 and a second end portion 78 extending from the intermediate portion 76.

A spear at the end of the second end portion 78 of the bend 72 includes a point 80 terminating in a tip 82. The point 80 is rolled-out or bent-out from the longitudinal axis of the shank 66.

According to a unique aspect of this embodiment, the second end portion 78 of the bend 72 curves smoothly back toward the second end 70 of the shank 66. Further, the outer edge of the point 80 facing away from the shank 66 has an arcuate shape. The first end portion 74 of the bend 72 also has an arcuate shape. Preferably, the outer edge of the point 80 and the first end portion 74 of the bend 72 are disposed co-radially or concentrically with respect to each other from a common center, as shown in FIG. 3. This provides a large open gap for excellent hook penetration.

Further, a barb 84 is formed on the inside portion of the spear facing the shank 66. This places the barb 84 opposite from the outer edge of the point 80 so as to increase penetration and hook retention since the point 80 and the barb 84 will be imbedded in opposite directions in a hooked fish.

Further, the keeling bend arrangement of the hook 60 causes the point 80 to ride point up as the hook 60 is reeled in through the water. This places the point 80 in an ideal position for penetration and hooking of a fish.

Another aspect of the present invention is shown in FIGS. 4, 5 and 6. As shown therein, a hollow body 90 preferably formed of a translucent, flexible material, such as Mylar, has an initial, tubular shape as shown in FIG. 5. The tubular body 90 may be provided in a number of different colors, including colors with iridescent tints.

As shown in FIG. 5, the tubular body 90 is initially disposed over the shank 66 of the hook 60. One end of the body 90 is closingly secured to the second end 70 of the shank 66 by suitable means, such as by use of an adhesive, epoxy resin, etc., or simply by tying the end of the tubular member 90 in a closed manner to the second end 70 of the shank 66.

A rigid insert 92 is then slid into the open first end 91 of the tubular body 90. The insert 92 preferably has an inverted V-shape formed of two outwardly diverging, angularly disposed legs 94 and 96 which are interconnected at one end by a central edge 98. The insert 92 is preferably formed of a rigid plastic material which is ideally transparent for reasons which will become apparent hereafter.

Furthermore, an outer edge 100 of each of the legs 94 and 96 of the insert 92 has an arcuate shape, as shown in FIG. 5, which extends outwardly to a pronounced outermost surface 102 from the end disposed adjacent to the eye 64 of the shank 60 and then smoothly curves to the rear portion of the central edge 98 located adjacent to the second end 70 of the shank 66. This provides a simulated shad fish shape to the tubular body 90 when the insert 92 is mounted within the body 90. Since the insert 92 is preferably formed of a transparent material and the tubular body 90 is preferably formed of a translucent material, the shank 66 of the hook 60 will be visible through the side of the body 90 in the same manner as the spine of a small bait fish. This provides a more natural attraction or characteristic to the body 90 in that it more closely simulates a natural bait fish.

The first end 91 of the tubular member 90 is then securely closed about the first end 68 of the shank 66 by means of adhesive, epoxy resin, tying, etc.

When the body 90 is mounted on the shank 66, the outermost surfaces 102 of the insert 92 and the corresponding outer surface of the body 90 extend away from the shank 66 in the same direction as the first end portion 74 and the intermediate portion 76 of the keeling bend 72. This disposes the body 90 away from the point 80 so as not to interfere with the hooking of a fish.

Figure 9:
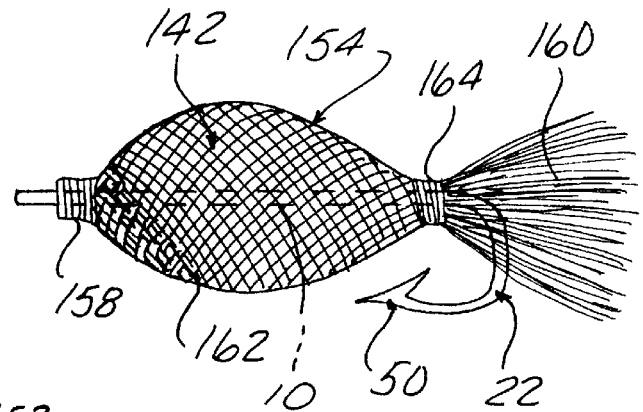
FIG. 9 is a side elevational view showing the insert of FIG. 7 mounted on a fish hook and enclosed with a weave body.
Figure 7:
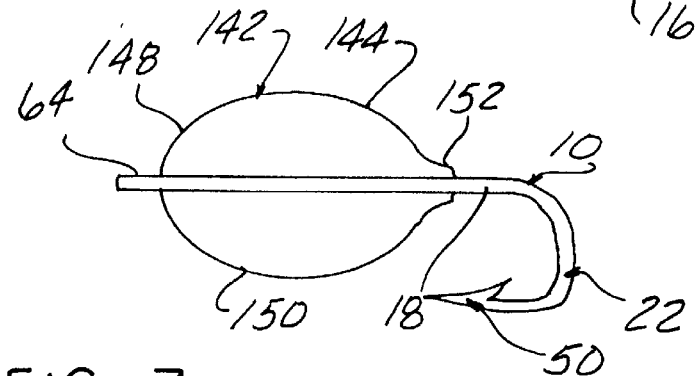
FIG. 7 is a side elevational view of an artificial fly/lure constructed in accordance with another embodiment of the present invention.
Figure 8:
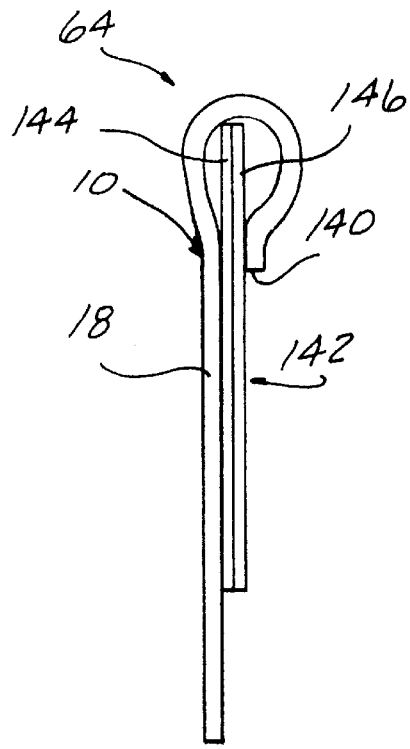
FIG. 8 is a plan elevational view showing the artificial fly/lure depicted in FIG. 7.

Another embodiment of the present invention is shown in FIGS. 7–9. This embodiment is again described for use on the keel hook 10. However, it will be understood that this embodiment as well as all other embodiments of the artificial fly/lure of this invention may be employed with any other type of fly hook.

In this embodiment, the eye 64 of the hook 10, as shown in detail in FIG. 8, has a generally U-shaped bend terminating in an end 140 spaced a short distance from the shank 18. A rigid insert or member 142 is inserted into the space between the end 140 and the shank 18 of the hook 10. Although the insert 142 may be formed of one single member, in a preferred embodiment, the insert 142 is formed of two identical side-by-side disposed members as shown in FIG. 8. The two members denoted by reference numbers 144 and 146 are press fit between the end 140 and the shank 18 or adhesively joined together and to the hook 10 by means of suitable adhesive disposed between the two members 144 and 146 and between the outer surface of the members 144 and 146 and the adjoining portions of the shank 18 and the end 140 of the eye 64.

The two members 144 and 146 may take the shape of a suitable bait fish. Thus, as shown in FIG. 7, each member 144 and 146 has a tip end 148 and an outer periphery which extends in a gentle curve to an enlarged center portion 150. The outer periphery of each member 144 and 146 then tapers sharply to a tail end 152 at the shank 18 of the hook 10. Other body shapes, such as a generally elongated, tubular shape are also usable.

FIGS. 9 and 10 depict a weave body 154 which is mounted over the insert 142 to act as a protective cover for the insert 142. The weave body 144 is formed of a mesh material having an open weave of crisscrossed tubular members 156. The weave body 154 is cut to length with an open first end 158 and an opposed second end 160 which are interconnected by a generally tubular side wall 162.

Any suitable high strength yet flexible weave material may be employed for the weave body 154. By example only, in a preferred embodiment, the weave body 154 is formed of a material sold under the tradename "Skuf-Jacket" by Bentley-Harris Manufacturing Co., Lionville, Pa. This material is sold in elongated cylindrical, tubular form which can be cut to an appropriate length defined by the first and second ends 158 and 160. The material is available in at least three diameter sizes, with the smallest diameter having the tightest weave; i.e., the smallest openings between adjacent crisscross members; while the larger diameter has a more open, looser weave defined by larger apertures between the crisscrossed members.

Figure 11:
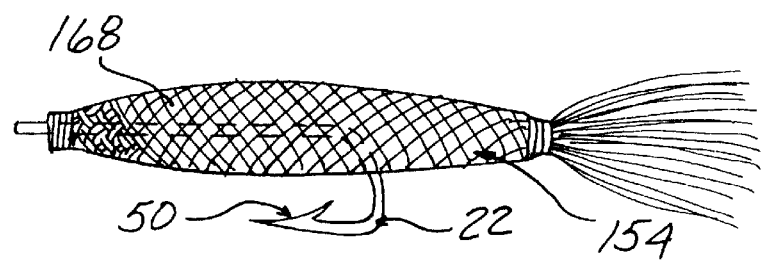
FIG. 11 is a side elevational view of the body of FIG. 10 mounted on a fish hook and includes an inner insert.

In assembling the weave body 154 for use with the hook 10 and the rigid insert 142 shown in FIGS. 10 and 11, the weave body 154 is cut to length forming the first end 158 and the second end 160. The first end is then cauterized to prevent it from unravelling. The weave body 154 is then urged over the rigid insert 142 from the eye 64 end of the hook 10. The first and second ends 158 and 160 of the body 154 may be urged together to enlarge the diameter of the side wall 162 to fit over the enlarged center portion 150 of the rigid insert 142.

The overall length of the body 154 between the first end 158 and the tied end 164 may be squeezed together causing the intermediate portion 162 of the weave body to expand outward to a larger diameter as shown in FIG. 9. This enlargement forms the weave body 154 in the general shape of a shad fish. When the weave body 154 has been fully inserted over the entire length of the rigid insert 142, as shown in FIG. 9, the first end 158 of the weave body 154 is disposed adjacent to the eye 64 of the hook 10. The hook 10 extends through the weave body 154 and has the bend 22 and the point 50 disposed exteriorly of the second end 160 of the weave body 154. The second end 160 may then be frayed to form an enlarged tail. Depending on the desired tail length, suitable tie means, such as a KEVLAR thread, is tied tightly about the hook and intermediate portion of the weave body 154 as shown in FIG. 9. Suitable waterproof adhesive may then be applied over the cauterized first end 158 and the threads 164 to retain the ends of the weave body 154 in position on the fish hook 10.

The weave body 154 serves two important functions for the artificial fly/lure of the present invention. First, it provides a wear resistant outer layer for the artificial fly/lure which resists damage to the artificial fly/lure typically caused by the sharp teeth of game fish. Secondly, the openings or apertures between the crisscrossed weave members of the weave body 154 allow the decorative pattern and/or color of the rigid insert 142 to be visible through the weave body.

Figure 12:
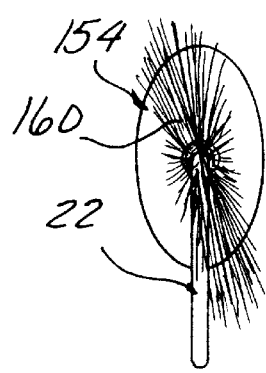
FIG. 12 is a right hand end view of the artificial fly/lure of FIG. 11.

As shown in FIG. 12, when the second end 160 is frayed, the frayed ends 160 assume a generally angular offset shape as shown in FIG. 12 with respect to the shank 18 of the hook 10. This provides a natural bend in the tail or second end 160 which causes a slight break in rotation of the artificial fly/lure as it is drawn through the water or when water flows around it.

FIGS. 10 and 11 depict an alternate embodiment of the weave body and rigid insert in which the rigid insert 168 has a generally elongated form. A smaller diameter weave body may be employed with the rigid insert 168 to provide a close encompassing shape about the elongated rigid insert 168. The construction of the artificial fly/lure shown in FIG. 11 is the same as that described above and shown in FIGS. 7–9 except that the shank of the hook is shortened causing the bend 22 and the point 50 to exit the weave body 154 intermediate the opposite ends of the body 154. The second end of the body 154 is tied to a closed shape with the frayed tail 160 extending outward therefrom.

Apart from the rigid insert 142, since the weave body 154 has a generally cylindrical shape, it may be employed with any fish hook and both with and without a rigid insert. When used without an insert, the weave body 154 is secured at opposite ends 158 and 164 to the shank 18 of a hook 10 as described above. It should be noted that the second end 164 can be closed by itself without the shank as shown in FIG. 11.

Figure 13:
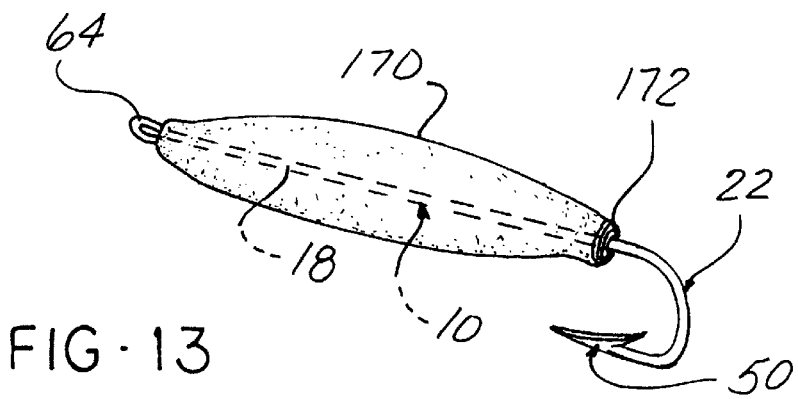
FIG. 13 is a perspective view of yet another embodiment of the artificial fly/lure according to the present invention.

FIG. 13 depicts yet another embodiment of the present invention which is employable with any type of fly hook, such as the keeling bend fly hook 10 described above by example only. In this embodiment, a fiberglass tape of selectable width is cut to length and then soaked in water at 70° F.–80° F. to soften the tape. The fiberglass tape 170 is then tightly wrapped in a plurality of turns 172 about the shank 18 of the hook 10. Since the tape is soft, the turns 172 may be shaped to any attractor game fish shape; i.e., flattened in width, tapered at one or both ends, etc.

Figure 14:
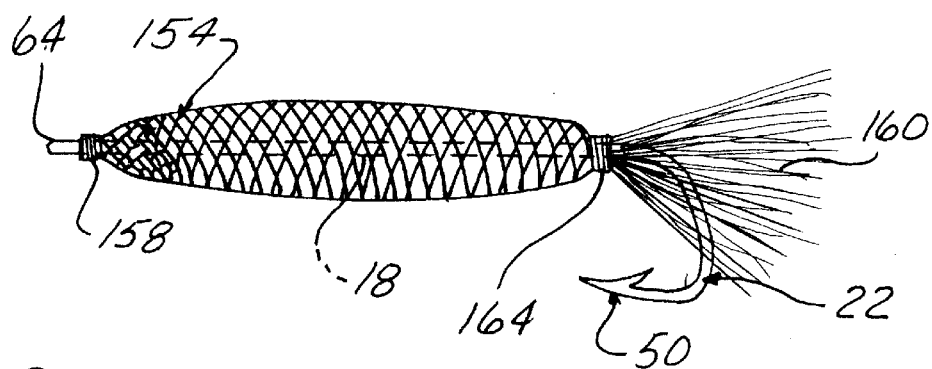
FIG. 14 is a side elevational view showing a modification to the artificial fly/lure depicted in FIG. 13.
Figure 16:
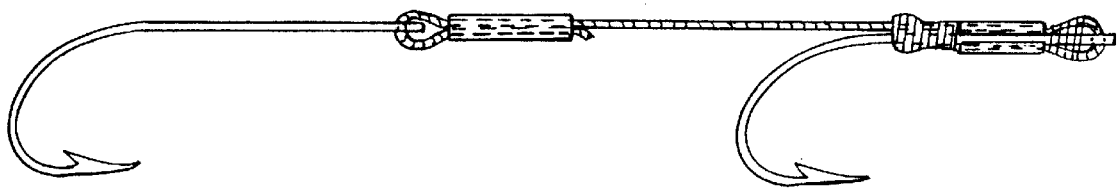
FIG. 16 is a side elevational view of a prior art tandem hook tying arrangement.

The fiberglass tape is then allowed to dry or cure to form a hard body 170 which can serve as the entire artificial fly/lure body itself. Alternately, a weave body 154 shown in FIG. 14 may be cut to size and mounted over the fiberglass body 170 in the same manner as described above and shown in FIGS. 9 and 11.

Adhesive may be applied to one end of the fiberglass body 170 adjacent the eye 64 and alternately at the opposed second end adjacent the bend 22 in the hook 10 to securely retain the fiberglass body 170 on the shank 18 of the hook 10 and to prevent rotation of the body 170 about the shank 118.

Figure 15:
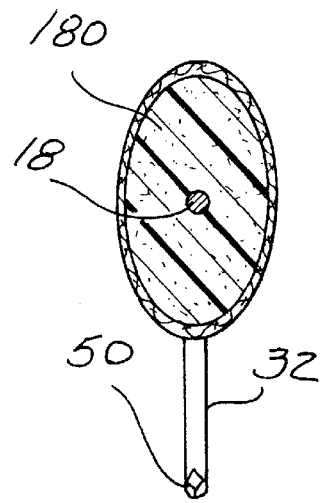
FIG. 15 is a cross-sectional view taken through another embodiment of the present invention.

A body 180 may alternately be formed of a resilient foam material as shown in FIG. 15. The foam material may be any suitable open or closed cell foam. Open cell form will have a tendency to absorb water thereby allowing the artificial fly/lure to sink below the surface of the water. Closed cell foam will have a high degree of buoyancy so as to enable the fly/lure to continually float on the surface of the water. A weave body 154 as described above may be applied about the suitably shaped foam body and secured at opposite ends to the hook 10 in the same manner as described above.

In the above-described embodiments, a unique artificial fly/lure is disclosed which, in one embodiment, has a rigid insert mounted about the shank of a fish hook. A tear resistant open mesh, weave body is mounted about the rigid insert to prevent damage to the artificial fly/lure caused by sharp fish teeth. The open mesh of the weave body, in addition to providing a protective covering for the rigid insert, allows the decorative attractor designs or colors on the rigid insert to be visible through the mesh openings thereby providing an attractive lure for game fish.

In an alternate embodiment, fiberglass tape is softened and then wrapped and shaped about the shank of a fish hook to form an attractor bait fish body. The fiberglass body, after hardening, may be employed itself or covered by an outer weave body.

The body of the artificial fly/lure of the present invention may also be formed of an open cell or closed cell foam to provide buoyancy or sinking characteristics. The foam body is covered with the weave body for damage resistance.

Figure 17:
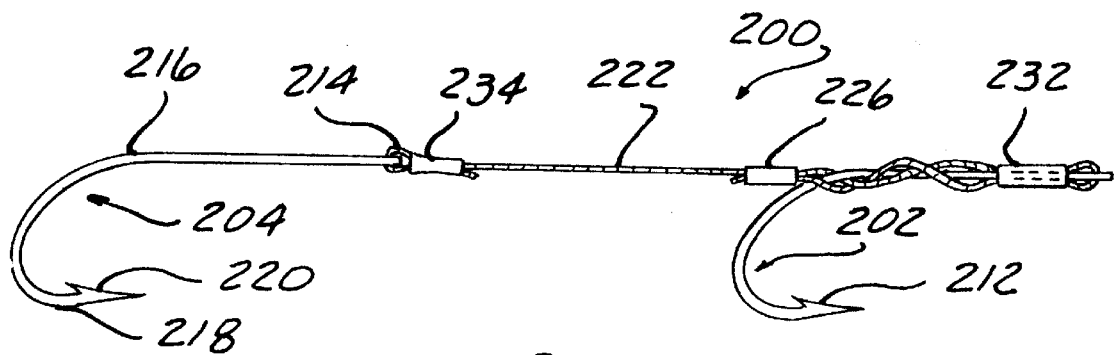
FIG. 17 is a side elevational view of a tandem in-line hook tying arrangement according to the present invention.
Figure 18:
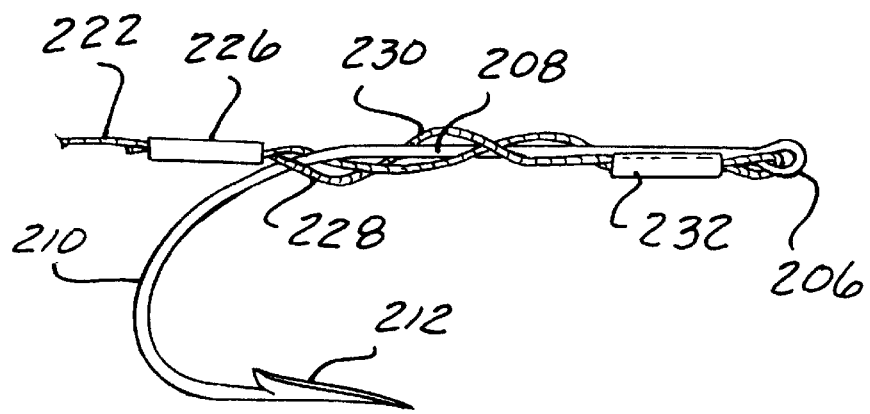
FIG. 18 is an enlarged view of the tying arrangement shown in FIG. 17.
Figure 19:
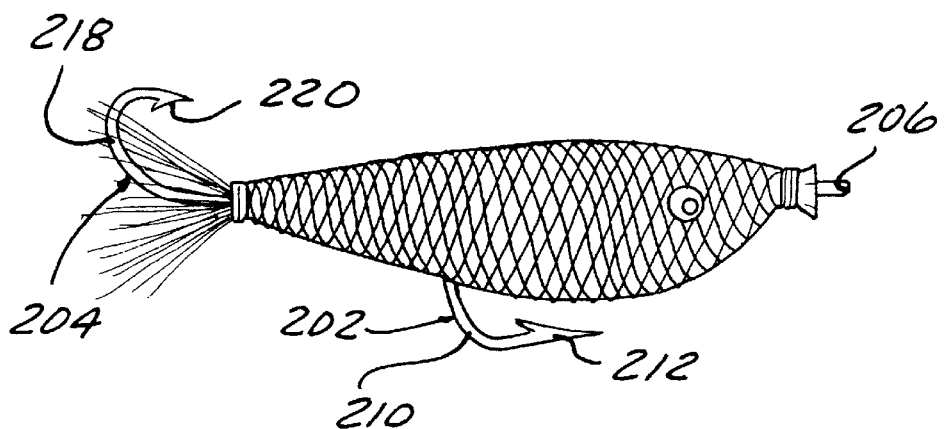
FIG. 19 is side elevational view of an artificial fly using the tandem hook connection of FIG. 17 with the bends of the two hooks extending in opposite, outward extending directions.

Referring now to FIGS. 17–19, there is depicted another embodiment of the present invention 202 and 204 which are interconnected by a unique connection or tying means 200.

The hooks 202 and 204 may be identically constructed or differently constructed as well as being provided in practically size, shape, etc. For simplicity, the hook 202 will be defined as including and eye 206, an elongated shank 208, a bend 210 of any form and a tip 212, also of any conventional shape or form. The second hook 202 also has an eye 214, an elongated shank 216, a bend 218 and a tip 220.

The unique connection or tying arrangement interconnects the two hooks 202 and 204 such that the shanks 208 and 216, respectively, remain substantially axially in-line for straight pull along the two shanks 208 and 216 when a fish strikes the second hook 204.

The connection means 200 includes a single substantially non-elongatable cable 222. By way of example only, the cable 222 comprises a wound steel cable having an outer plastic coating.

A first end 224 of the cable 222 is fixedly mounted in a first crimp connector 226. The cable 222 extends from the first end 224 through at least one and preferably two interleaved or interwoven loops 228 and 230 about the shank 208 of the hook 202 between the first crimp connector 226 and the eye 206 of the first hook 202. In general, the section 228 extending from the first end 224 of the cable 222 passes under a portion of the other cable section 230. On the other side of the shank 208, the other section 230 also passes over a portion of the section 228 thereby forming, in a plan view, a figure eight between the eye 206 and the first connector 226. Portions of the sections 228 and 230 are also crimped by a second crimp connector 232 positioned adjacent the eye 206. Quick dry adhesive is used to fixably attach the first connector 232 to the shank 208 adjacent to the eye 206.

This figure eight-type wound connection of the cable 222 securely attaches the cable 222 to the first hook 202 while insuring that the cable 222 extends generally axially in-line from the shank 208 of the first hook 202.

The opposite end of the cable 222 passes through the eye 214 of the second hook 204 and returned into a fixed mount in a second crimp connector 234.

FIG. 17 also shows that both of the hooks 202 and 204 may be connected by the cable 222 such that the tips 212 and 220 project to the same side of the aligned shanks 208 and 216. Alternately, as shown in FIG. 19, the tip 220 of the second hook 204 may extend in an opposite direction from the aligned shanks 208 and 216 from the tip 212 of the first hook 202.

As also shown in FIG. 19, any of the artificial fly bodies described above may be mounted about the interconnected hooks 202 and 204. Such bodies may include the V-shaped disk 92 shown in FIGS. 5 and 6, the single or multiple disks 142 and 144 shown in FIGS. 7 and 8, a hollow mesh body shown in FIG. 9, and the wound fiberglass body shown in FIG. 13 or the foam body 180 shown in FIG. 15, both of which may be provided with an outer mesh layer as shown in FIG. 15.

Figure 20:
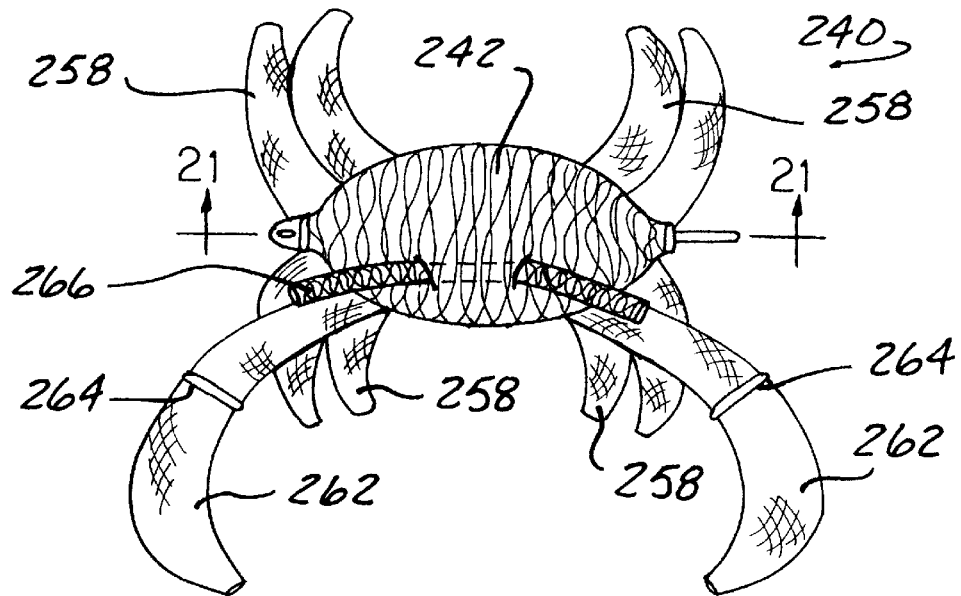
FIG. 20 is a plan view of one embodiment of an artificial crab constructed in accordance with the teachings of the present invention.
Figure 21:
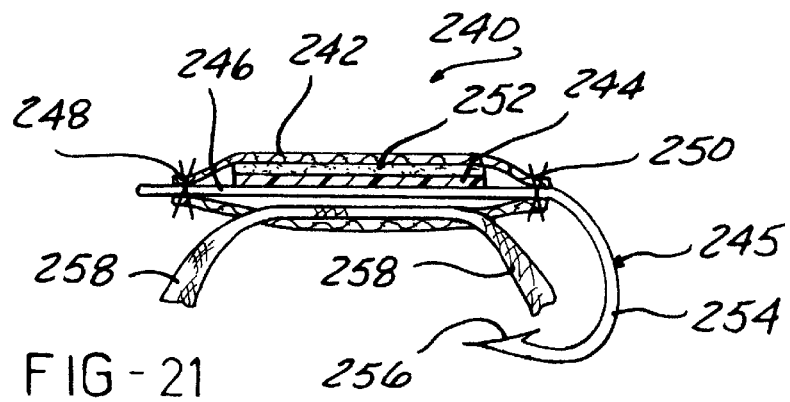
FIG. 21 is a cross-sectional view generally along line 21—21 in FIG. 20.
Figure 22:
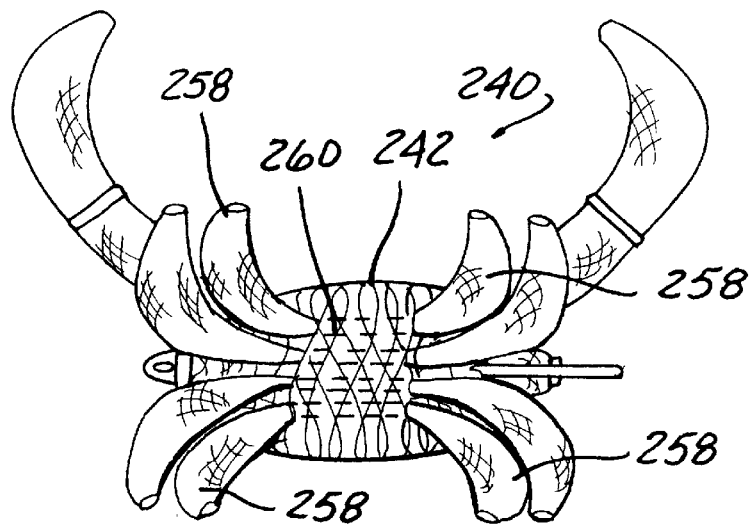
FIG. 22 is a bottom view of the artificial crab shown in FIG. 20.

Referring now to FIGS. 20–22, there is depicted another embodiment of an artificial fly/lure which is formed in the shape of a crab 240. The artificial fly/lure 240 includes a body 242 formed of the woven mesh material described above. A generally oval or circular disk 244, formed of a rigid plastic, is disposed in the interior of the body 242 to shape the body 242 to a generally oval shape shown in FIG. 20. The shank 246 of a hook is inserted through the open ends of the body 242 before the ends 248 and 250 are closed by means of threads wound around the ends 248 and 250 and covered by an adhesive or epoxy to fix the shank 246 of the hook in the body 242. As also shown in FIG. 21, an optional foam or resilient pad 252 is interposed within the interior of the body 242 between one layer of the body 242 and the disk 244. The bend 254 of the hook 245 projects downwardly to a tip 256 disposed below the underside of the body 240 when the body 240 is viewed in the normal use position shown in FIG. 20.

A plurality of leg are joined to the body 242 to simulate the legs of a crab. Four pairs 258 are joined to the body 242. The legs forming each pair of legs 258 are formed of the same mesh material used to form the body 242 except that the mesh tube is provided in a smaller diameter. As depicted in FIG. 22, the leg mesh in its initial elongated, tubular form is woven through the mesh forming the body 242 as indicated by reference number 260. Since the shorter length rod 259 is joined to the ends of the leg mesh 258, the rod 259 bends the leg mesh 258 into a curved shape as shown in FIGS. 20 and 22. The ends of each leg 258 are closed by means of heat or a drop of epoxy and joined to an end of a flexible rod 259 extending through each leg 258. The flexible member is preferably a monofilament fishing line with a length less than the length of the mesh forming each leg 258.

Two large pinchers 262 are also joined to the body 242 by weaving an elongated tubular member through the underside of the body 242 as shown in FIG. 22. The pinchers 262 are formed in an arcuate, curved shape shown in FIGS. 20 and 22 by a flexible rod 263 extending therethrough as in the legs 258. A simulated joint 264 is formed in each pincher, and optionally in the leg 258, by folding the mesh material forming each pincher 262 back onto itself before pulling it outward to form a crease as shown in FIG. 20.

Finally, simulated eyes are formed by weaving a tubular member 266 through an upper surface of the body 242, with outer ends of the tubular member extending outward from the top surface of the body 242. The ends of the tubular member 266 are cauterized by melting the ends of the tubular member 266 to form a generally enlarged, flattened area. A drop of black paint is applied to the flattened ends of the tubular member 266 to simulate an eye. Alternately, a flexible rod, not shown, is disposed in the member 266. Preferably, the rod is formed of black, 300 lb test monofilament fishing line which gives an appearance of black eyes at the ends of the member 266.

A different species of crab is shown in FIG. 23. In this fly, a body 270 is formed substantially as the body described above in FIGS. 20–22 with eyes formed on the end of a tubular member 266. A hook 245 is joined to the underside of the body 270, preferably by inserting the shank 246 of the hook 245 through the interior of the body 270 prior to closing the ends of the body 270 about the shank 246 of the hook 245 by means of threads, as described above. In this simulated crab 270, four pairs of legs 272, with two pairs being larger than the other two pairs, are joined to the body 270 preferably by weaving through the body 270 in the manner described above. Each leg 272 has a shorter length flexible monofilament rod 273 extending between and joined to each end of each leg 272 to bend each leg 272 into a curved shape. Finally, feathers or fur 274 are joined to the body 270, preferably by attaching the ends of the feathers 274 to the ends of the body 270 prior to wrapping the thread around the end of the body 270.

Figure 24:
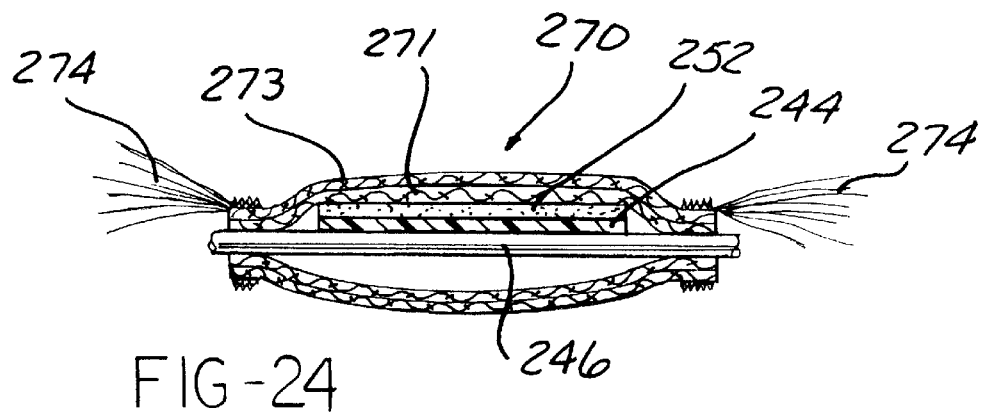
FIG. 24 is a cross-sectional view generally taken along line 24—24 in FIG. 23.

FIG. 24 depicts an alternate embodiment which may be employed for the body 270 or the body 242. In this embodiment, the body is formed by two layers of woven mesh material including a first inner layer 271 and a second outer layer 273. The layers 271 and 273 are preferably in the form of separate, woven mesh tubular members which are concentrically arranged by inserting one tubular member into the other tubular member. The outer ends of the tubular members or layers 271 and 272 are tied at opposite ends in the same manner described above and shown in FIGS. 20–23. Further, a rigid disk 244 and an optional foam or resilient pad 252 may be interposed between one side of the shank 246 and the inner layer 271.

This embodiment provides a double strength layer of woven mesh material for added tear resistance to the artificial fly or lure. Further, the tubular members forming the layers 271 and 273 may be selected of different colors to provide a different overall visible appearance for the artificial fly or lure since the color of the inner tubular inner layer 271 will be visible through the openings in the outer tubular mesh layer 273.

Figure 25:
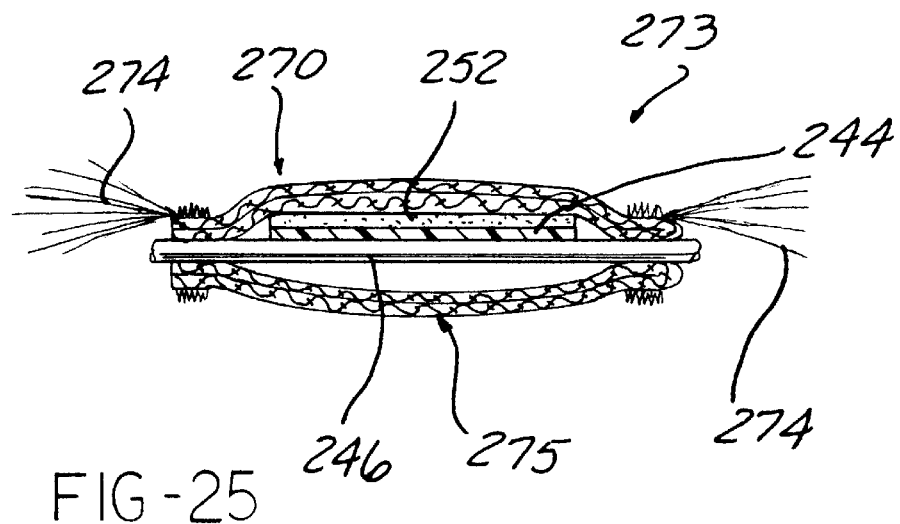
FIG. 25 is a cross-sectional view, similar to FIG. 24; but showing an alternate embodiment of the artificial crab shown in FIG. 23.

FIG. 25 depicts yet another embodiment which may be used to form the body 270 or the body 242. In this embodiment, a single tubular woven mesh member 275 is folded inward or outward from one end toward the opposite end to form a double layer as shown in FIG. 25. This also provides a double layer of woven mesh material for added tear resistance. As in the previous embodiments, a rigid disk 244 and an optional resilient or foam pad 252 may be interposed between the shank 246 and the inner surface of the double wall tubular member 275. Fur 274 is secured to the ends of the tubular member 275 by the threads.

In yet another artificial fly/lure 280 is shown in FIG. 26 a smaller species of crab is depicted. In this embodiment, the body 282 is hollow and receives only the shank of a hook 284 therethrough. Further, the bend and tip 286 of the hook 284 extends upward above the upper surface of the body 282.

Due to the small size of the body 282, a pair of legs 286 are formed as bent extensions of the ends of the body 282.

Fur, feathers or synthetics 288 are joined to the ends of the body 282 by means of thread wrapped around the ends of the body 282 and the shank of the hook 284. Eyes 290 are joined to the body 282 by weaving an elongated tubular member through the upper surface of the body 282. The ends of the tubular member are melted to form an enlarged, spherical end which is painted black to simulate an eye. In this embodiment, the body 270 is hollow and does not include the rigid disk 244.

In the crab 280 shown in FIG. 26, the bottom surface of the body 282 is pressed inward forming a concave depression which adds rigidity to the overall shape of the body 282. Alternately, the body 282 may remain in a generally tubular, hollow form and a disk, such as a rigid disk 244 and an optional resilient or foam pad 252 may be interposed between the shank of the fish hook 284 and one surface of the body 282 to add rigidity yet flexibility to the overall shape of the body 282.

Figure 29:
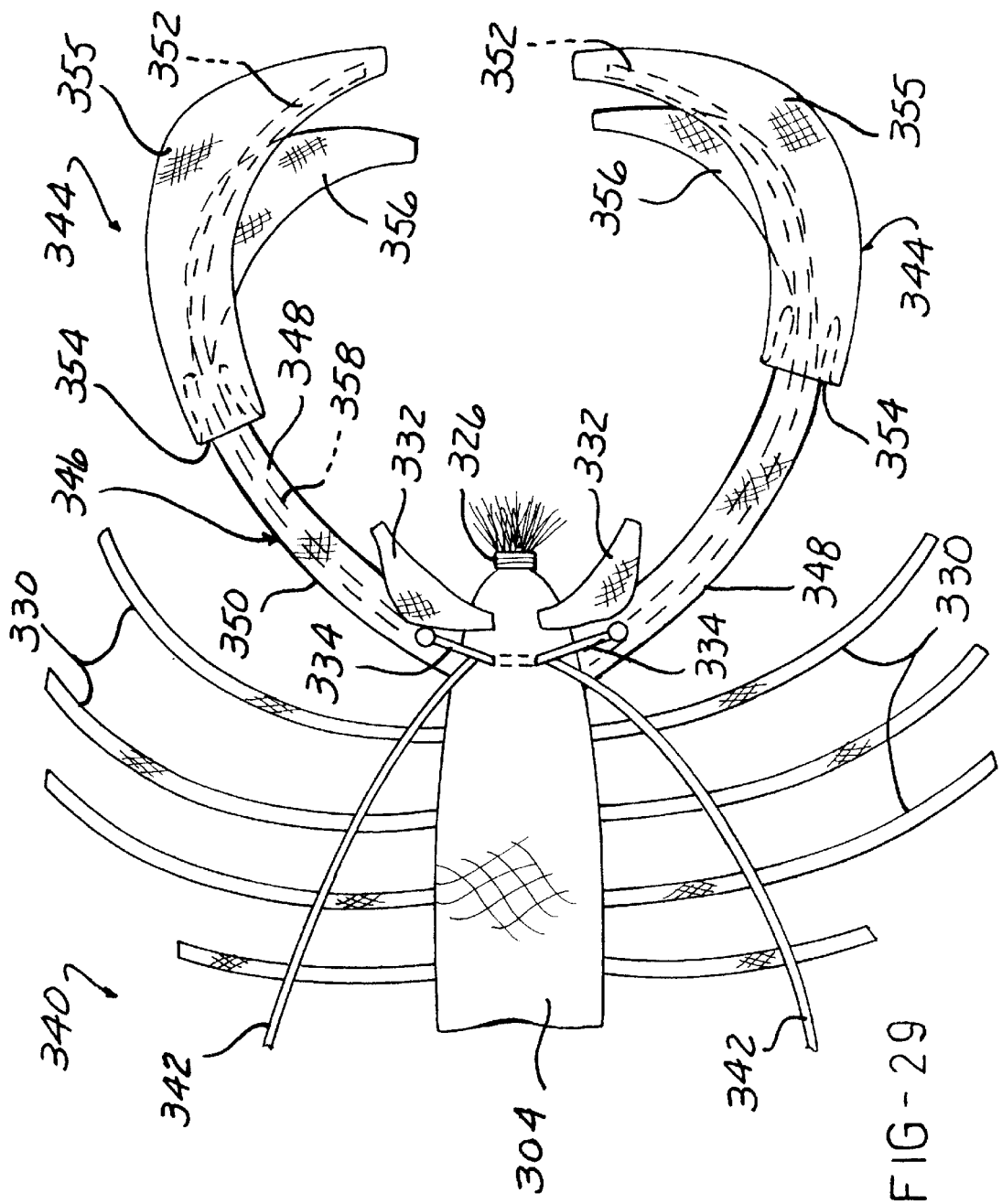
FIG. 29 is a partial view showing another embodiment of an American lobster constructed in accordance with the teachings of the present invention.

Referring now to FIG. 27–29, there are depicted two embodiments of the use of a mesh body to form an artificial fly/lure which simulates the shape and appearance of an American lobster or a spiny lobster.

FIGS. 27 and 28 depicts an artificial fly/lure 300 which simulates a spiny lobster. The body of the lobster 300 includes first and second body parts 302 and 304 which are joined to the shank 306 of a hook 308. The first or rear body part 302 is formed of the same woven mesh material described above. However, one end of the tubular mesh is folded in on itself as shown by reference number 310 to form a hollow interior cavity surrounding the shank 306 of the hook 308. A rigid disk 311 and an optional foam layer 313 may be interposed between the upper folded over portion of the first body part 302. A plurality of threads 312 wound around a portion of the first body part 306, adjacent to the eye 314 of the hook 308. An end portion 316 extends from the threads 312 as part of the first body part 302 and forms a tail. The second body part 304 is attached at one end to the shank 306 of the hook 308 by means of threads 320 as shown in FIG. 28. A similar rigid disk 305 and an optional foam pad 307 may be disposed within the second body part 304. The shank 306 of the hook 308 extends through a bottom part of the second body part 304 to the bend 322 and tip 324 which are spaced from the bottom surfaces of the first and second body parts 302 and 304. The other end of the second body part 304 is closed by means of a plurality of wound threads 326.

A plurality of legs 328 are mounted on the first body part 302. As in the preceding crab embodiments, the legs 328 are formed of an elongated tubular members of woven mesh material which are forced through openings in the first body part 302. Outer ends of each tubular member extend outward through the first body part 306 to form the legs 328. Similar legs 330 are mounted on the second body part 304. Also, a pair of horns 332 are mounted on the second body part 304 by forcing a single tubular member through the mesh of the second body part 304 and then compressing and melting the outer ends of the tubular member to form the horns 332 into the desired shape. A pair of eyes 334, shown in FIG. 28, are formed in the same manner and attached to the front end of the second body part 304. The enlarged end of the tubular member forming the eyes 334 may be colored black to simulate an eye. Finally, an elongated pair of antennae 336 are overlaid on the first end of the second body part 304 prior to applying the threads 326 about the first end of the second body part 304. Some or all of the legs 328 or 330, the horns 332 and the antenna 336 may have a flexible rod, not shown, extending therethrough, as described above, for rigidity as well as to shape the legs etc., into a curved shape FIG. 29 depicts a modification to the artificial fly/lure 300 in which an artificial fly/lure 340, having substantially the same construction as the artificial fly/lure 300 shown in FIGS. 27 and 28, has a shape which simulate the features of an American lobster.

In this embodiment, the second body part 304 also has a pair of eyes 334 and a pair of horns 332. A plurality of legs 330 are attached to the second body part 304 and project outward from opposite sides of the second body part 304. A pair of elongated antennae 342 are mounted on the second body part 304, by threading an elongated tubular mesh member through apertures in the mesh material forming the second body part 304 and then curving the ends rearward as shown in FIG. 29.

Two pairs of claws or pinchers denoted generally by reference number 344 are attached to the second body part 304. The pair of pinchers 344 are formed of a single tubular member 346 which is forced through the mesh in the bottom side of the second body part 304 and then curved outward to form first and second sections 348 and 350. A thin, elongated, shorter length, flexible rod 352 extends from end to end through the tubular member 346 and is joined to each end. A joint is formed in the tubular member 346 by forcing an immediate portion over on itself and then partially extending the folded over section outward to form a hollow cavity or crease 354. The outer end of each folded over portion is then sealed at an outer end to form an enlarged main claw 355 shown in FIG. 29.

The secondary claw 356 is formed by means of a smaller diameter tubular mesh member having closed outer ends which is bent into the shape of a smaller claw or pincher. After being forced through the main claw 355, the outer ends of the smaller mesh member are curved into pincers or claws by a shorter length rod 357 extending through and joined to each end of the secondary claw 356.

Various markings in the form of paint, colored markets, etc., can be applied to the outer surface of the bodies 300 and 340 to more accurately depict the coloring and scale design on a spiny or American lobster.

In summary, there has been disclosed a unique tandem hook connection which enables the shanks of two tandem arranged hooks to remain substantially in-line while providing a secure attachment of the second hook to the first hook. The present invention also discloses unique uses a tubular, woven mesh material in forming bodies and other appendages of an artificial fly/lure which provides both bait fish, as well as varieties of crab and lobster for use as artificial flies or lures.

In certain embodiments, the above-described artificial fly/lure provides a unique artificial fly which closely simulates the appearance and actions of a crab underwater or floating on the surface thereby making it an ideal attractor for fish whose diet includes crabs. The hollow legs formed of the woven mesh material, trap air. A quick jerk on the line causes the crab to right itself if the crab lands upside-down. A quick jerk can also forcibly remove all air from the legs causing the crab to gradually fall to the bottom of a body of water. Further, when the fishing line is pulled slowly, since the hook is oriented along the longitudinal axis of the body of each crab, each crab appears to walk sideways simulating the proper movement of a real crab. In addition, the fur on the crab folds back during such sideways movement to simulate a claw or pincher.

What is claimed is:

1. An artificial fly comprising:

a hook having a shank, an eye at one end of the shank, and a bend and tip at another end of the shank;

a hollow body with sidewalls formed of a continuous open mesh of crisscrossed strands with apertures therebetween opening to a hollow interior of the body;

the shank disposed in the body with the bend and tip extending outward from one end of the body and the eye of the shank extending outward from an opposite end of the body; and a plurality of legs joined to and extending from the body to form the body in the likeness of a crustacean, the legs formed of tubular, open mesh, hollow leg members with crisscrossed strands having apertures opening to the interior of each of the leg members.

2. The artificial fly of claim 1 further comprising:

a flexible rod extending through each of the leg members, only opposite ends of the rod fixed to opposite ends of each leg member.

3. The artificial fly of claim 2 wherein:

the flexible rod has a length shorter than the nominal length of the leg members to bend the leg members into a curved shape between the opposed ends.

4. The artificial fly of claim 1 wherein:

the tubular members have opposed ends and an intermediate portion, the intermediate portion woven through the open mesh of the body with the opposed ends extending outward from the body, and forming the legs.

5. The artificial fly of claim 1 further comprising:

a single tubular member joined to the body on opposite sides of the legs, outer ends of the tubular member formed as eyes.

6. The artificial fly of claim 5 wherein the single tubular member is woven through the body, with the opposed ends extending outward from the body.

7. The artificial fly of claim 1 wherein the body comprises:

a first body secured to the shank of the fish hook, one end of the first body folded inward on itself to form a hollow interior surrounding a portion of the shank of the fish hook;

a second body fixedly mounted at one end to the shank of the fish hook, the second body substantially axially in line with the first body.

8. The artificial fly of claim 7 wherein:

the bend and tip of the fish hook project outwardly below the first and second bodies.

9. The artificial fly of claim 7 further comprising:

at least one appendage formed of open mesh joined to one of the first and second bodies and having at least one end extending outward from the one of the first and the second bodies;

a support member extending through the at least one appendage.

* * * * *